United States Patent
Harris

(10) Patent No.: US 8,681,234 B2
(45) Date of Patent: Mar. 25, 2014

(54) SYSTEM AND METHDOD FOR CAPTURING AND DISPLAYING STILL PHOTO AND VIDEO CONTENT

(75) Inventor: Adam Harris, San Diego, CA (US)

(73) Assignee: Sony Computer Entertainment America LLC, San Mateo, CA (US)

( * ) Notice: Subject to any disclaimer, the term of this patent is extended or adjusted under 35 U.S.C. 154(b) by 425 days.

(21) Appl. No.: 12/892,713

(22) Filed: Sep. 28, 2010

(65) Prior Publication Data

US 2012/0075488 A1    Mar. 29, 2012

(51) Int. Cl.
*H04N 5/225*    (2006.01)
*H04N 5/77*    (2006.01)

(52) U.S. Cl.
USPC ........................ 348/220.1; 386/225

(58) Field of Classification Search
None
See application file for complete search history.

(56) References Cited

U.S. PATENT DOCUMENTS

| | | |
|---|---|---|
| 5,122,821 A | 6/1992 | Nealon |
| 5,926,218 A * | 7/1999 | Smith ................ 348/207.99 |
| 2002/0197067 A1* | 12/2002 | Ohnishi ................ 386/120 |
| 2003/0112347 A1 | 6/2003 | Wyman |
| 2004/0189823 A1* | 9/2004 | Shibutani ................ 348/231.1 |
| 2006/0119711 A1* | 6/2006 | Ejima et al. ................ 348/222.1 |
| 2006/0159430 A1* | 7/2006 | Sugahara et al. ................ 386/95 |
| 2007/0222865 A1 | 9/2007 | Levien et al. |
| 2008/0062270 A1 | 3/2008 | Lawson et al. |
| 2009/0040382 A1* | 2/2009 | Nagaoka et al. ................ 348/559 |
| 2009/0167909 A1* | 7/2009 | Imagawa et al. ................ 348/262 |
| 2011/0102616 A1* | 5/2011 | Migiyama et al. ......... 348/222.1 |

OTHER PUBLICATIONS

PCT International Search Report dated Dec. 8, 2011 for International Application No. PCT/US11/48199.

* cited by examiner

*Primary Examiner* — Justin P Misleh

(74) *Attorney, Agent, or Firm* — Joshua D. Isenberg; JDI Patent

(57) ABSTRACT

Still images can be captured during capture of video frames at different resolutions. Still image data and video data at different resolutions and in different data formats can be combined into a single file and stored in a memory. Storing the video data and still image data in a single file simplifies the process of displaying video in conjunction with display of representative still images.

20 Claims, 6 Drawing Sheets

SYSTEM AND METHOD FOR CAPTURING AND DISPLAYING STILL PHOTO AND VIDEO CONTENT

FIELD OF THE INVENTION

Embodiments of the present invention are related to video capture device and more specifically to a video capture device that can record a series of video frames and capture still images at a different resolution than the video frames and store the video frames and still images as a single file.

BACKGROUND OF THE INVENTION

A recent advance in the field of photography is the development digital cameras. The optical system works the same as in film cameras, typically using a lens with a variable diaphragm to focus light onto an image pickup device. The diaphragm and shutter admit the correct amount of light to the imager, just as with film but the image pickup device is electronic an electronic image sensor rather than a photosensitive chemically-treated film. Many compact digital still cameras can record sound and moving video as well as still photographs. Digital cameras have many capabilities that film cameras do not. For example, digital cameras can display images on a screen immediately after they are recorded, store thousands of images on a single small electronic memory device, record video with sound, and delete images to free storage space. Some digital cameras can crop pictures and perform other elementary image editing.

Many digital cameras now offer the ability to capture still pictures and video sequences. However, compromises are made between still picture quality and performance when recording video. For example, processing of the video information limits a rate at which consecutive still pictures can be recorded. Furthermore, the video recording is interrupted when the still pictures are captured. In particular, several video frames are typically missed while the camera is processing the still picture instead of processing the video.

The prevalence of video cameras has made it popular to post video and still photos online for others to see. However, there is a technological schism between posting video and photo content online. Photos are more interesting and less time consuming to post and view than video. Currently when a photo is posted online a thumbnail of the photo is displayed. However, for video a box with a "play" button is displayed. Sometimes a thumbnail image is displayed along with the box with the play button. However, there is no convenient way to post video with an automatically-selected still image because still images and video images are stored in different formats. Specifically, still images are generally stored in .jpg format and video is stored in .mp4 or some similar format. To post a video with a still image as a thumbnail, the consumer who posts the video has to find an appropriate still image and post it together with a link to the video.

It is within this context that embodiments of the present invention arise.

BRIEF DESCRIPTION OF THE DRAWINGS

The teachings of the present invention can be readily understood by considering the following detailed description in conjunction with the accompanying drawings, in which.

DESCRIPTION OF THE SPECIFIC EMBODIMENTS

Figure 1:
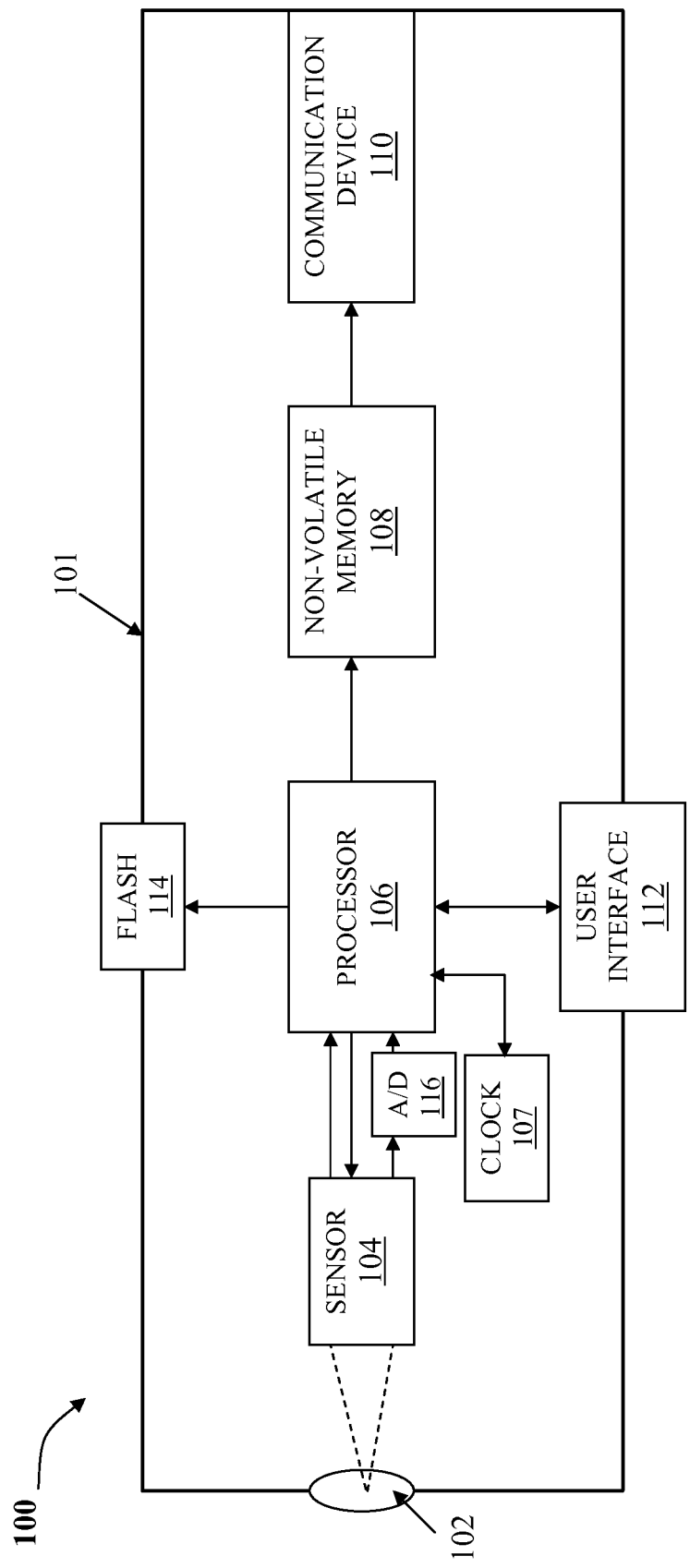
FIG. 1 is a schematic diagram of a hand-held digital camera.

An example video acquisition data device in the form of a hand-held camera 100 is shown in the schematic diagram of FIG. 1. The camera is schematically shown to include a case 101, an imaging optical system 102 and a user interface 112 that communicates with a processor 106. The interface 112 includes user operated switches and controls, as well as indicators of the operation and status of the camera. An optional light flash unit 114, controlled by the processor 106, may also be included. The optical system 102 can be a single lens, as shown, but will normally be a set of lenses. The sensor 104 typically contains a large number of individual photodetectors arranged in a two-dimensional array of rows and columns to detect individual pixels an image, such as charge-couple devices (CCD). The optical system 102 serves to focus an image of a scene onto the camera's two-dimensional photo-detector array of sensor 104. The sensor array 104 may be operational to convert the optical images into a series of values in a signal. The values conveyed in the signal may be analog voltages representing an intensity value at a predetermined color for each individual sensor element of the sensor array 104. The sensor array 104 may include an electronic cropping (or windowing) capability. The electronic cropping capability may be operational to limit readout of image elements in a window (or an active area) of the sensor array 104. Signals proportional to the intensity of light striking the individual photo-detectors are obtained from the output of the sensor 104 in a time sequence, typically by scanning them in a raster pattern, where the rows of photodetector elements are scanned one at a time from left to right, beginning at the top row, to generate a frame of video data from which an image may be reconstructed.

The camera 100 may include a system clock 107 coupled to the processor 106 and or sensor 104. A clock signal may be supplied by the processor 106 to the sensor 104 and analog-to-digital converter 116. Additional timing signals for synchronizing operation of the sensor 104 and the processor 106 are also generated in the processor 106 and supplied to the sensor 104. In some embodiments, the clock 107 may be part of the processor 106. Alternatively, a separate system clock may be utilized and/or the synchronizing timing signals may be generated in the sensor 104 and supplied to the processor 106 instead. The processor chip 106 is connected to the aperture, the shutter and other components of the camera in order to control them.

Data of images captured by the camera may be stored in a non-volatile memory 108 that is installed within the camera. The memory 108 can be a commercially available semiconductor flash electrically erasable and programmable readonly-memory (EEPROM), small removable rotating magnetic or optical disk, magnetic tape, volatile semiconductor memory with a battery back-up or other non-volatile memory in which video data of image frames acquired by the sensor 104 can be stored. Data of a large number of individual frames of data are programmed into the memory 108 from the processor 106 as the sensor 104 acquires these data. Additional image support data useful or necessary for subsequent processing of the image data are also programmed in the memory 108 along with the image frame data that they support.

Although the memory 108 could be made to be physically removable from the camera by use of a flash memory card or removable small hard disk system, the memory 108 in this example is permanently installed within the camera case 101. When the user wants to transfer the image frame data out of the camera, it is done through a communications device 110 that receives data read out of the memory 108. The communications device 110 can take a number of different forms, such as a socket into which a cable is connectable to an image processing workstation, an infra-red digital data transmission device, a radio-frequency signal transmitter, or other type of wireless data communications link.

From the consumer's point of view the camera could roll video from the moment the camera is turned on. In some digital cameras, a marker can be placed on the video frame chosen as the still image when the shutter button is pressed. Current digital cameras can do this but are limited to only a few (e.g., four) still images. An additional drawback of many current digital video cameras is that video images are stored on tape and still images are stored in a completely separate part of memory. In addition, video and still images are stored at different values of resolution. Typically video frames are stored at 1 megapixel per frame but still images are at 4 megapixels. Furthermore, most consumers are likely to demand a resolution of at least 10 megapixels.

As discussed above, there is a problem in uploading video and still images online due to the different formats for still and video images. To overcome this problem and allow a consumer to present an online slide show of still images which could be clicked on to start the video, there is a need of a new file format (referred to herein for convenience as the .xxx format) that combines the video and the representative still image in a single file. By way of example, the .xxx format could identify a .jpg file for a still image and the .mp4 file for video. When a file in the .xxx format is uploaded a slide show of still images would be presented which could be clicked on to start the video.

Figure 2A:
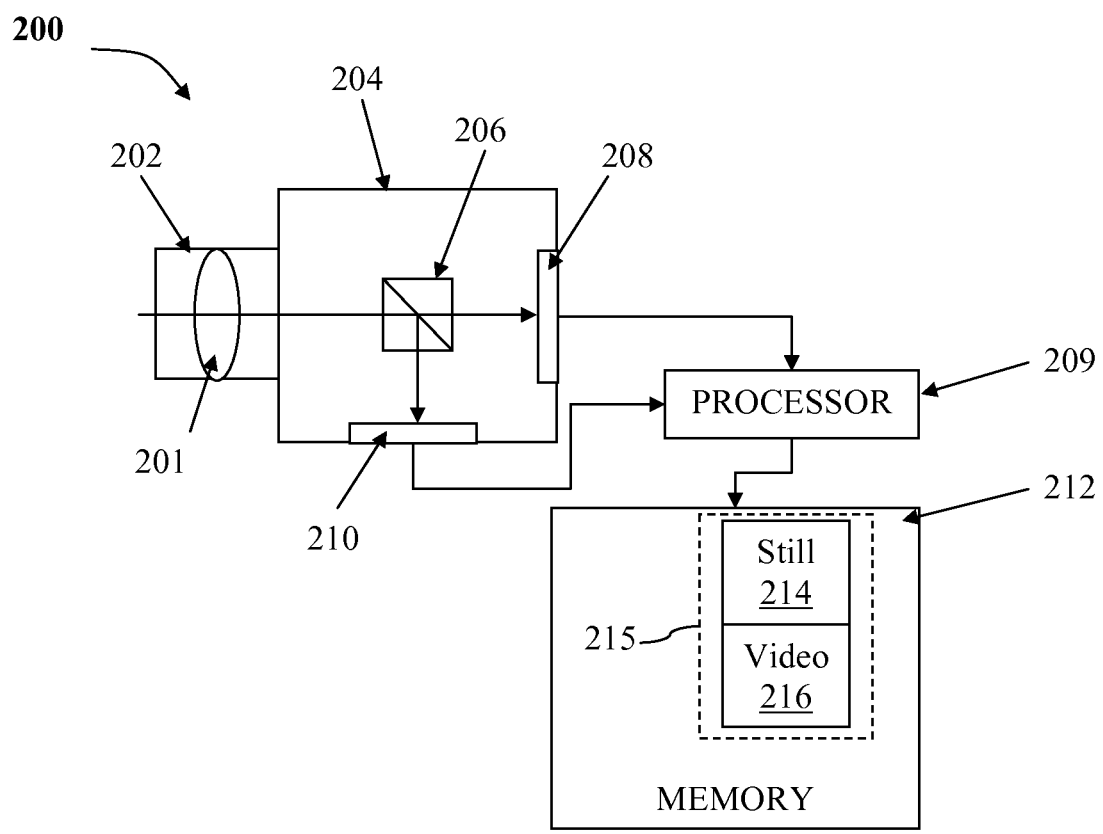
FIG. 2A is a schematic diagram of a portion of a digital camera system in accordance with a first embodiment of the present invention.
Figure 2B:
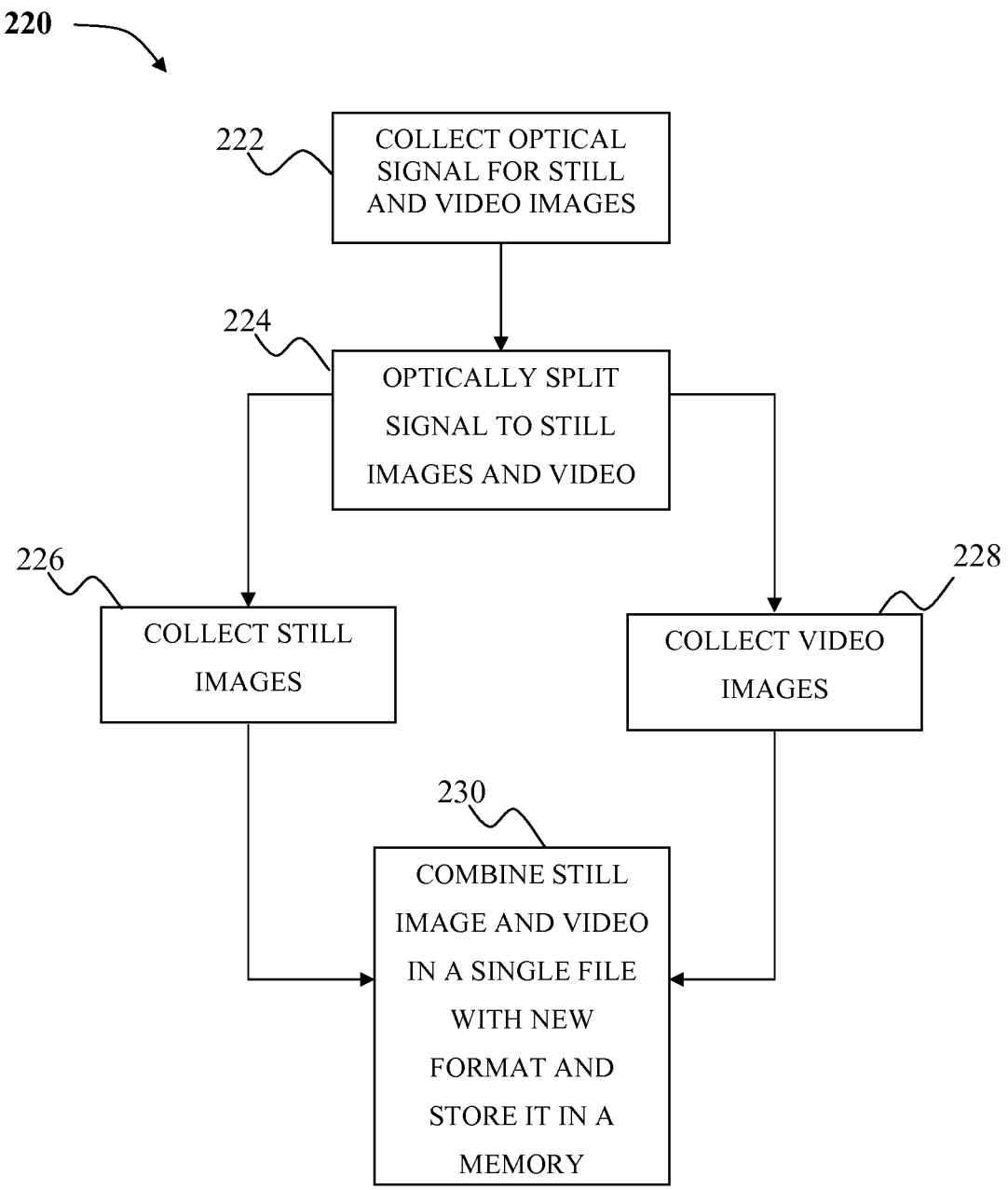
FIG. 2B is a flow diagram illustrating a method for processing the still image and the video in a single file in accordance with the first embodiment of the present invention.

One solution is described in FIGS. 2A-2B in accordance to a first embodiment of the present invention. FIG. 2A is a schematic diagram of a portion of a digital camera 200 of a type similar to that depicted in FIG. 1. As shown in FIG. 2A, the camera 200 includes an optical system 202 that may include a lens 201. A sensor 204 includes a beam splitter 206, photodetectors, e.g., CCD 208 for detecting the still images and photodetectors. e.g., CCD 210 for detecting the video. The photodetectors 208 and 210 are positioned to collect images with light from the beam splitter 206. Data representing still images captured by the CCD 208 and video captured by the CCD 210 can be processed by a processor 209 before they are stored in a recording memory 212. The processor 209 is configured, e.g., by suitable software programming, hardware, or firmware, to store the still and video images in their respective different formats a common single file 215.

FIG. 2B is a flow diagram illustrating a method 220 for forming a single file 215 containing both still images 214 and video 216. Light for still and video images is collected by the optical system 202 as indicated at 222. The light collected by the optical system 202 is split as indicated at 222, e.g., by beamsplitter 206. Part of the light is directed to the still image photodetector 208 as indicated at 226 and part is directed to the video photodetector 210 as indicated at 228. The video and still images can be stored in memory in different formats but combined into a single file under a special format as indicated at 230.

By way of example, and not by way of limitation, the video CCD 210 can collect video images from the moment the camera is turned on. The processor 209 may store the video images in memory as a video bit stream in a suitable video format (e.g., ITU-R BT.656-4, H.264/AVC, MPEG-2, MPEG-4) having a sequence of pictures (or frames). When the shutter button is pressed, the processor 209 can collect a still image from the still CCD 208. The processor 209 can place a digital marker in the video data 216 to identify the corresponding video frame captured at the instant the still image was collected. A similar digital marker identifying the corresponding video frame can be placed in the data 214 that represents the still image. The still image data 214 may generally comprise one or more still pictures in a suitable format (e.g., JPEG, TIFF). Data representing the video stream and still image and are sent to the video photodetectors 210 and the still image photodetectors 208 as indicated at 224, 226 and 228.

The video image 216 the video and the representative still image(s) 214 are processed and combined in a single file 215 with a new format (referred to as .xxx format) that is then stored in the memory 212. The new .xxx format identifies the file for the still image (e.g., JPEG, TIFF) and the file for the video (e.g., ITU-R BT.656-4, H.264/AVC, MPEG-2, MPEG-4). The new file format also identifies the relative time (or times) that the still image (or images) were captured with respect to the time frame of the video stream.

When the single file 215 is uploaded the uploading software can determine from the time marker for each still image 214 the corresponding frame in the video 216. A slide show of the still images 214 could be presented to a user. When the user clicks on a given image, presentation software could determine from the time marker for the still image the corresponding frame in the video 216 at which to start playback. The video would then start at the video frame corresponding to the still image. To the user, it would appear that the still image "comes alive" when the user clicks on it.

Figure 3A:
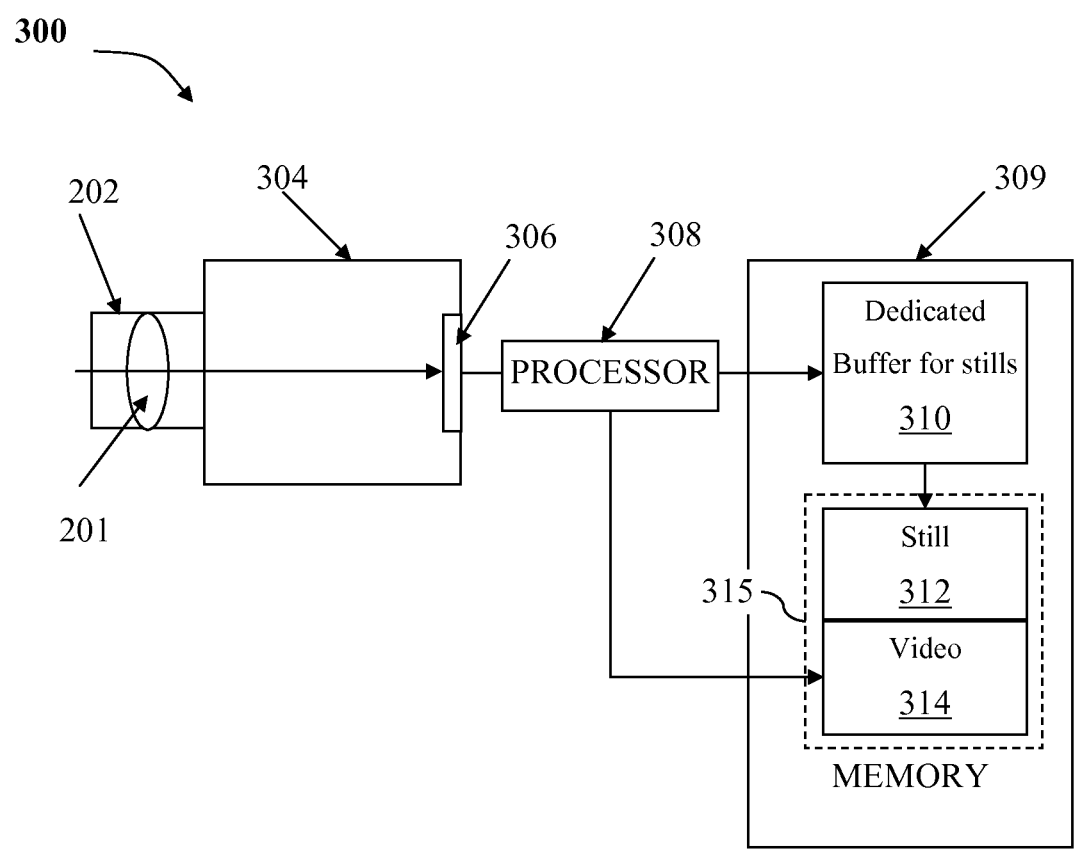
FIG. 3A is a schematic diagram of a second digital camera system in accordance with a second embodiment of the present invention.
Figure 3B:
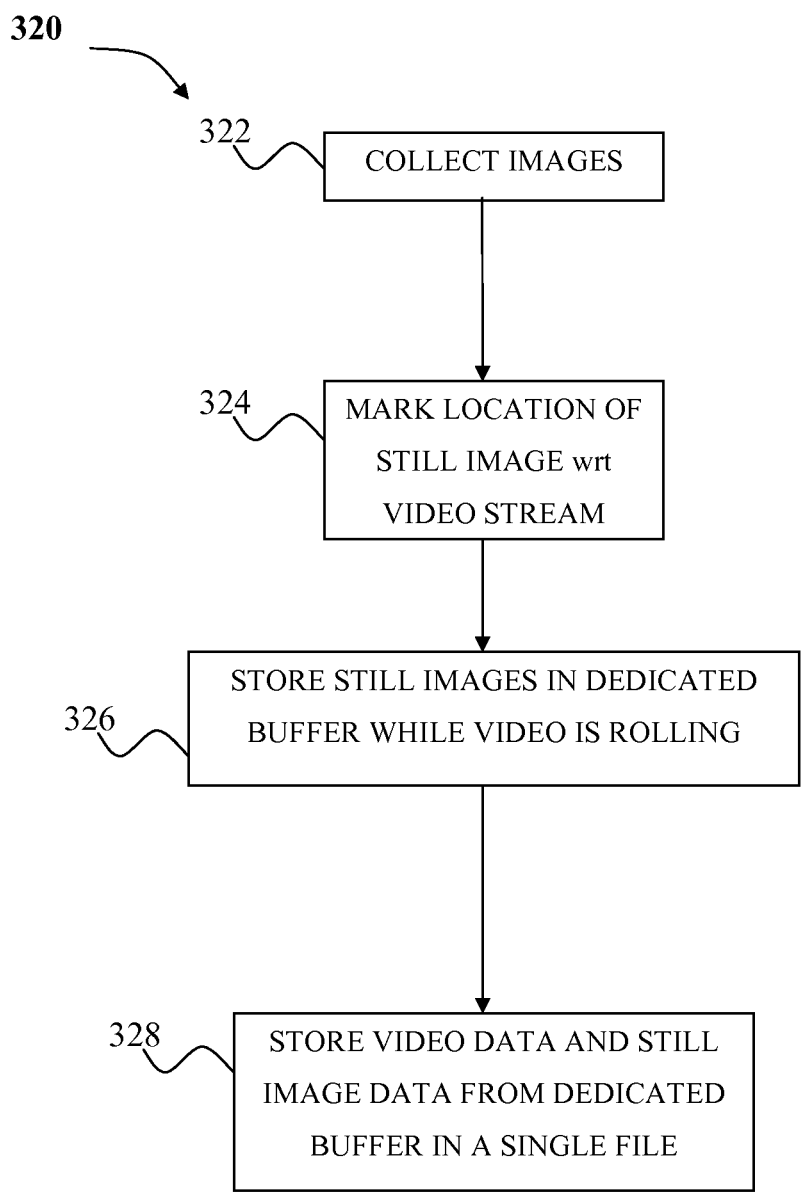
FIG. 3B is a flow diagram illustrating a method for processing the still image and the video in a single file in accordance with the second embodiment of the present invention.

Another solution for combining still and video images into a single file is described in FIGS. 3A-3B in accordance to a second embodiment of the present invention. FIG. 3A is a schematic diagram of a portion of a digital camera 300 similar to that depicted in FIG. 1. As shown in FIG. 3A, the camera 300 includes an optical system 202 that may include one or more focusing optical elements such as lenses 201. An image sensor 304 includes a single photodetector 306 for detecting both still image and video image. Data of still images and video captured by the camera are processed in a processor 308 before are stored in the recording memory 309. In this embodiment, the camera also includes a separate dedicated buffer 310, which can be located in the memory 309 or in a separate dedicated storage device. The dedicated buffer is coupled to the photodetector 306 and processor 308 for temporarily storing still image data 312. The processor 308 can combine the still image data 312 and video data 314 into a single file 315 and store the single file in the memory 309.

FIG. 3B is a flow diagram illustrating another method 320 for forming a single file of both still images and video. In this embodiment, images are captured by a single image detector. Specifically, the video can be captured from the moment the camera is turned on as indicated at 322. The video frames can be stored to the memory 309 in a normal manner as video data 314. The video data 314 may generally comprises data representing a video bit stream in a suitable video data format (e.g., ITU-R BT.656-4, H.264/AVC, MPEG-2, MPEG-4) having a sequence of pictures (or frames).

When a still image is captured, the processor 308 can mark the location of the still image with respect to the video stream in the video data, as indicated 324. For example, when the shutter button is pressed, a marker can be placed on the video frame chosen as the still image. Alternatively, a marker may be placed in the still image data 312 that synchronizes the still one or more still images to one or more corresponding video frames. The still image data 312 may generally comprise data representing one or more still pictures in a suitable still image data format (e.g., JPEG, TIFF). The still image can be quickly loaded to the dedicated buffer memory 310 while the video is rolling as indicated at 326. The video data and the still image data can be combined into a single file with a new format (referred to as .xxx format). The single file can also be stored in the memory 309 as indicated in 328. The new .xxx format can identify a file for the still image data in a first format (e.g., JPEG, TIFF) at a still image resolution (e.g., 4 megapixel or 10 megapixel) and a separate file for the video data in a video data format (e.g., ITU-R BT.656-4, H.264/AVC, MPEG-2, MPEG-4) at a different resolution (e.g., 1 megapixel). When a new format file is uploaded a slide show of still images can be presented which can be clicked on to start the video at a corresponding video frame.

Figure 4:
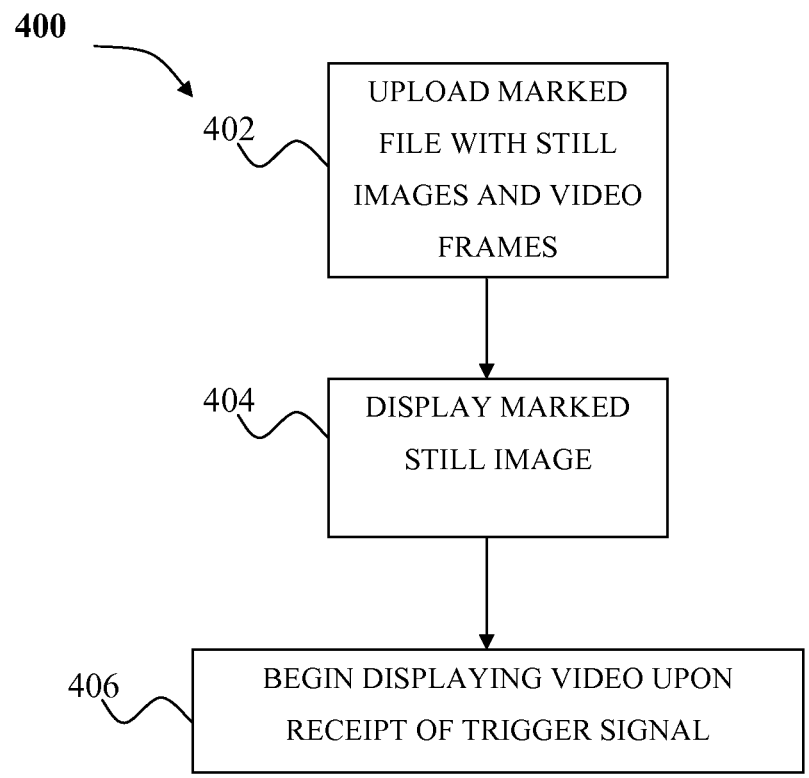
FIG. 4 is a flow diagram illustrating a method for display of still images and video stored in a single file in accordance with a third embodiment of the present invention.

Such synchronized display of video and still images captured in accordance with the embodiments described above may be implemented in accordance with a third embodiment illustrated by the flow diagram of FIG. 4. Specifically, a single file containing video data representing video frames in a first format at a first resolution and still image data representing one or more still images in a second format at a second resolution can be uploaded to a display device as indicated at 402. By way of example and not by way of limitation, the file may be uploaded to a website. Alternatively, the file may be uploaded to a standalone display device, e.g., a video picture frame, video projector or a digital camera having a display screen and playback feature. The single file contains a marker in the still image data or the video data that synchronizes a still image to a corresponding one of the video frames. The marker marks a starting point for playback of the video frames. Such a file may be generated as described above.

Once uploaded, a representative still image may be displayed on the display device at the first resolution as indicated at 404. The representative still image is synchronized to a corresponding video image by the marker. Upon receipt of a trigger signal display of the video frames may start as indicated at 406. The video frames can be displayed at the second resolution. In some implementations, the video display may start at the video frame synchronized to the still image. Because the video images and still images are synchronized by the marker, the user merely has to select the representative image (or images) to display when uploading the file. This greatly simplifies the process of synchronizing display of video and still images allowing still images to "come alive". In an alternative implementation, a render feature can be implemented that allows video to rewind from a still to the start of a sequence of video frames. The video display can start from a first frame in the sequence. A signal, such as a flash can be displayed during display of the video sequence at a video frame corresponding to a still image to indicate where still image was taken.

The embodiments of the present invention can be applied to family photos and professional digital magazines. In addition, some embodiments can include a tool that separates out video and still formats from a new format file for backward compatibility.

All the features disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features. Any feature, whether preferred or not, may be combined with any other feature, whether preferred or not. In the claims that follow, the indefinite article "A", or "An" refers to a quantity of one or more of the item following the article, except where expressly stated otherwise. Any element in a claim that does not explicitly state "means for" performing a specified function, is not to be interpreted as a "means" or "step" clause as specified in 35 USC §112, ¶6. In particular, the use of "step of" in the claims herein is not intended to invoke the provisions of 35 USC §112, ¶6.

The reader's attention is directed to all papers and documents which are filed concurrently with this specification and which are open to public inspection with this specification, and the contents of all such papers and documents incorporated herein by reference.

What is claimed is:

1. A video capture device, comprising:
   an imaging optical system;
   a beam splitter optically coupled to the imaging optical system;
   an image sensor optically coupled to the beam splitter, wherein the imaging optical system and beam splitter are configured to focus an optical signal of a scene onto an image sensor;
   a processor coupled to the sensor; and
   a memory coupled to the processor,
   wherein the image sensor comprises:
   a first photodetector array configured to capture a sequence of video frames at a first resolution and a second photodetector array configured to capture a plurality of still images at a second resolution while the first photodetector is capturing the sequence of video frames;
   wherein the processor is configured to:
   store the sequence of video frames in the memory as video data;
   store the plurality of still images in the memory as still image data; and
   combine the video data having a first format and the still image data having a second format into a single file having a third format, such that the single file has the sequence of video frames at the first resolution and the plurality of still images at the second resolution, with each of the still images in the single file synchronized to a corresponding one of the video frames in the sequence.

2. The device of claim 1 wherein the second resolution is at least four times greater than the first resolution.

3. The device of claim 1 wherein the second resolution is at least ten times greater than the first resolution.

4. The device of claim 1, wherein the processor is further configured to:
   place a plurality of markers in the video data, the still image data, or a combination thereof, wherein each of the markers synchronizes the still image to the corresponding one of the video frames in the sequence, wherein each of the markers marks a starting point in the sequence for playback of the video frames.

5. A video capture device, comprising:
an image sensor;
an imaging optical system optically coupled to the image sensor, wherein the imaging optical system is configured to focus an optical signal onto the sensor;
a processor coupled to the sensor; and
a memory coupled to the processor, wherein the processor is configured to store video data representing a sequence of video frames in the memory at a first resolution in a video data format, and, while storing the video frames, store still image data corresponding to a plurality of still images in the memory at a second resolution in a still image data format;
wherein the processor is configured to combine the video data having the video data format and the still image data having the still image data format into a single file having a third format, the single file has the sequence of video frames at the first resolution and the plurality of still images at the second resolution, with each of the still images in the single file synchronized to a corresponding one of the video frames in the sequence of video frames.

6. The device of claim 5 wherein the processor is further configured to store the single file in the memory.

7. The device of claim 5 wherein the second resolution is at least four times greater than the first resolution.

8. The device of claim 5 wherein the second resolution is at least ten times greater than the first resolution.

9. The device of claim 5, wherein the processor is configured to place a plurality of markers in the video data, the still image data, or a combination thereof, wherein each of the markers synchronizes the still image to the corresponding one of the video frames in the sequence, wherein each of the markers marks a starting point in the sequence for playback of the video frames.

10. A method comprising:
capturing an optical signal corresponding to a scene with an imaging optical system; splitting the optical signal into first and second parts;
capturing the first part with a first photodetector as a sequence of video frames at a first resolution;
capturing the second part with a second photodetector as a plurality of still images at a second resolution;
converting the still images to still image data in a still image format and converting the sequence of video frames to video data in a video format;
synchronizing a still image of the plurality of still images to a corresponding one of the video frames;
combining the still image data and video data into a single file having a third format, such that the single file has the sequence of video frames in the first resolution and the plurality of still images in the second resolution, with each of the still images in the single file synchronized to a corresponding one of the video frames in the sequence; and
storing the single file in a memory.

11. The method of claim 10 wherein the second resolution is at least four times greater than the first resolution.

12. The method of claim 10 wherein the second resolution is at least ten times greater than the first resolution.

13. The method of claim 10, wherein synchronizing the still image to the corresponding one of the video frames includes placing a plurality of markers in the video data, the still image data, or a combination thereof, wherein each of the markers synchronizes synchronizing a still image of the plurality of still images to a corresponding one of the video frames, wherein each of the markers marks a starting point in the sequence for playback of the video frames.

14. A method comprising:
capturing an optical signal corresponding to a scene with an imaging optical system and imaging the optical signal onto a photodetector array;
capturing a sequence of video frames with the photodetector array and storing video data representing the video frames in the memory at a first resolution in a first format;
while capturing the video frames, capturing still images with the photodetector array and storing still image data representing the still images in a dedicated location in the memory in a second format at a second resolution;
synchronizing a one of the still images to a corresponding one of the video frames;
combining the video data and the still image data into a single file having a third format, such that the single file has the sequence of video frames in the first resolution and the plurality of still images in the second resolution, with each of the still images in the single file synchronized to a corresponding one of the video frames in the sequence; and
storing the single file in the memory.

15. The method of claim 14 wherein the second resolution is at least four times greater than the first resolution.

16. The method of claim 14 wherein the second resolution is at least ten times greater than the first resolution.

17. The method of claim 14, wherein synchronizing the one of the still images to the corresponding one of the video frames includes placing a plurality of markers in the video data, the still image data, or a combination thereof, wherein each of the markers synchronizes, wherein each of the markers marks a starting point in the sequence for playback of the video frames.

18. A method for synchronized display of video frames and still images, comprising:
uploading a single file containing video data representing a sequence of video frames in a first format at a first resolution and still image data representing a plurality of still images in a second format at a second resolution, wherein the video data and the still image data are combined into the single file having a third format, such that the single file has the sequence of video frames at the first resolution and the plurality of still images at the second resolution, with each of the still images in the single file synchronized to a corresponding one of the video frames in the sequence, wherein the single file contains a plurality of markers in the still image data, the video data, or a combination thereof, wherein each of the markers synchronizes a one of the still images to a corresponding one of the video frames;
displaying one or more of the still images at the first resolution on a display, wherein each of the one or more displayed still images is synchronized to a corresponding video frame by the markers which each mark a corresponding starting point in the sequence for playback of the video frames;
upon receipt of a trigger signal starting display of the video frames.

19. The method of claim 18 wherein the trigger signal corresponds to a selection of one of the displayed images, starting the display of the video frames starts at the video frame synchronized to the selected one of the still images.

20. The method of claim 18 wherein the display of the video frames includes displaying a signal indicating a frame in the sequence that corresponds to a still image during playback of the video frames.

* * * * *